United States Patent [15] 3,653,771
Piringer [45] Apr. 4, 1972

[54] METHOD AND DEVICES FOR THE DETERMINATION OF COLORS AND COLOR TOLERANCES IN A VISUAL MANNER IN ANY KIND OF ARTIFICIAL LIGHT OR SUNLIGHT

[72] Inventor: Fritz Piringer, Stiege 10, 13 Graf Starhemberggasse, Vienna, Austria

[22] Filed: Oct. 29, 1969

[21] Appl. No.: 872,427

Related U.S. Application Data

[63] Continuation of Ser. No. 262,985, Mar. 5, 1963.

[30] Foreign Application Priority Data

Mar. 8, 1962 Austria ..................A 1924/62

[52] U.S. Cl.............................356/194, 35/28.3, 356/195
[51] Int. Cl.................................................G01j 3/46
[58] Field of Search..............356/173, 174, 178, 191, 194, 356/195; 35/28.3; 88/1 MI, 1 P, 14 C, 14 CB, 14 CC, 14 CN, 14 VC, 14 E, 14 R, 23 C, 73, 74, 84, 85, 112

[56] References Cited

UNITED STATES PATENTS

1,597,830 8/1926 Rueger...................................356/194
2,649,017 8/1953 McCarty................................356/175
2,684,010 7/1954 Bukkley.................................356/192

Primary Examiner—Ronald L. Wibert
Assistant Examiner—J. Rothenberg
Attorney—Waters, Roditi, Schwartz & Nissen

[57] ABSTRACT

Color evaluation of a color sample is effected by producing in a simultaneous field of vision a plurality of separate color comparison regions each differing in color slightly from one another and juxtaposed with a multiplicity of images of a single small area of a color sample. The color of the sample images can be compared simultaneously with the colors of the comparison regions and a color attribute of the comparison regions varied until visual correspondence is obtained between the sample color and one of the comparison regions.

26 Claims, 26 Drawing Figures

PATENTED APR 4 1972 3,653,771

METHOD AND DEVICES FOR THE DETERMINATION OF COLORS AND COLOR TOLERANCES IN A VISUAL MANNER IN ANY KIND OF ARTIFICIAL LIGHT OR SUNLIGHT

This is a continuation of application Ser. No. 265,985 filed Mar. 5, 1963.

This invention relates to a method and devices for the determination of colors, particularly of non-self-luminous objects. Such objects are divided into the following groups:

a. Transparent objects (solid, liquid, gaseous) whose colors are determined in transmitted light.

b. Opaque objects (solid, liquid, gaseous) whose surface is tested and whose color and/or gloss is determined in incident (reflected) light at defined angles.

c. All those objects of groups (a) and (b) above, which, in addition, produce a characteristic color phenomenon (a so-called "fluorescent color") under special illumination (e.g. ultraviolet light), which is different from their appearance in normal light.

The colors of all objects of groups (a), (b) and (c) can be compared and determined, and it is an object of the invention to provide a method and means for attaining this result.

Heretofore no adequate means for measuring colors have been available to large sectors of industry, the arts and commerce, where color is processed as a raw material, where colorations are carried out, or where the natural color of substances or objects is merely observed and critically evaluated as a feature of quality of the substance or object. Physical methods for measuring colors have been in existence for 50 years and since 1931 there has been available the internationally recognized color system of the International Commission on Illumination (C.I.E.). This system, however, can only be employed at institutes, since very sensitive and costly apparatus and scientifically trained operating personnel are required. The location of a particular color in the C.I.E. system must be computed from the results of a number of physical measurements. For practical purposes, in the workshops and factories with highly vibrating machinery, such expensive, sensitive apparatus cannot be used; moreover, the evaluation of the results of measurements is time-consuming.

Photoelectric colorimeters with selenium-cells and a variety of filters have been commercially available for about 40 years. Chemists employ such colorimeters, for instance, for determining the concentration of solutions by taking the occurring changes of absorption as clues. The colorimeters are calibrated with standard solutions of known concentrations and can thus be used for determining the unknown concentration of the solution under investigation. It is the concentration rather than the color that is measured in this case, since color is only the means and not the end of the measuring process. Certain colorimeters, however, can be especially modified for the measurement of colors. Strangely enough, these devices, however, are not very popular.

Since the eye is the most sensitive "instrument" for measuring chromatic colors, it is an object of the invention to provide a device which is effective in making a color determination utilizing visual perception.

There are a few visual photometers still in use today, some of which can be adapted for color measurement by means of filters, but these are all designs of decades ago, and they do not meet the requirements which have to be established in order to provide optimal conditions as well as meet the considerations relating to color psychology, since a great variety of factors interact and the human "visual apparatus" can adapt to a large degree to external conditions.

Even today color charts are used as an expedient, on which primary and mixed colors are arranged according to one of the many color systems; e.g. the standard color charts of the British Colour Council, color charts according to Ridgeway, Baumann-Prase, Pope, Syreeni, the 'Color Dictionary' by Maerz & Paul, the RAL-Color Card, color charts according to Leisser, Hickethier, Johannson, Resselgren, Ostwald, Munsell and recently according to DIN 6164. Individual firms still produce their own charts or color samples, which, due to the lack of a universally recognized nomenclature, are referred to by delivery numbers or frequently only by fancy names. Without a color sample it is still impossible today to determine a color or to order a color, for instance by telephone. In their systematic set-up the individual color charts start from different bases and there is practically no relationship between them.

In everyday practical work, it is hardly possible to achieve an absolutely exact match of a given color sample (i.e. the impossibility to differentiate between sample and match). Irregularities and quality fluctuations in the raw materials, between the various stages of manufacture and finishing (printing, dyeing, etc.) are never completely avoided, and there is a great need for providing a standard for permissible color deviations (tolerances), their extent varying according to material, processing techniques and price.

The fact that in the field of colors no generally valid tolerances have been agreed upon as yet is mainly due to the lack of adequate simple tools for the practical control of such color tolerances. The problem is further aggravated by the fact that one single measured value does not suffice for the specification of a color. Three different attributes (characteristics) are necessary and all color systems operate with three quantities, e.g., hue, whiteness, and darkness stage.

Color is three-dimensional. For establishing permissible color deviation (color tolerances) two limiting values are required for each of the three color attributes, making a total of six limiting values. These values define a three-dimensional range of color tolerances, i.e. a color space in whose center the specified color is located. So far no device has been available for a continuous realization of such a color tolerance range in which these tolerance colors are seen altogether!

One considerable disadvantage common to all presently known devices for the determination of color is that in their respective fields of vision always a single comparison color was shown beside one sample color areas.

It is accordingly a further object of the present invention to provide a method and means by use of which the determination of colors and color tolerances may be achieved in a visual manner in any kind of artificial light or sunlight. According to the invention, a number of variable comparison color fields, which differ only slightly in color, are presented simultaneously, preferably as multiple images (e.g. nine) of one and the same spot of the sample being produced. The sample color is shown bordering on said comparison color fields sharply and without transition, whereby a simultaneous field of vision with individual, separate color comparison places is produced. The colors of the comparison color fields are changed successively, by changing the colors as well as by regulating the incident light of the three known color attributes, preferably one being changed jointly for all comparison color fields. The second and third attributes are changed preferably only within the zone and/or group divisions of the field of vision as are assigned to them. A given sample color is first examined as to visual correspondence at a coarse-matching place, which is preferably located centrally in the simultaneous field of vision, following which the degrees of visual deviation are compared at the individual, preferably peripherally located fine-matching places. The setting is again adjusted until finally the remaining deviations, reduced to the attainable minimum, are perceived to be of equal extent. The compliance or non-compliance with the three-dimensional tolerance range agreed upon for a given sample color is determined by evaluating the kind and direction of the deviation of the sample color from the values specified for it. When the color tolerance range has been complied with, color contrasts of slight to moderate strength and of varying direction will be observed in the simultaneous field of vision. Increasingly stronger contrasts of uniform direction will be observed when one of the limiting colors of the tolerance zones of the three color attributes—usually agreed upon in varying widths for each of them—has been exceeded.

Hence it follows that we are concerned here with the entirely novel type of multi-color field of vision; a simultaneous field of vision. A sample which is seen for instance ninefold is simultaneously seen with nine differently colored comparison color fields—altogether there are 18 color areas simultaneously present in the field of vision in this case. By means of multiple image formation, the sample is simultaneously confronted with any desired number of variable comparison colors. It must be stressed at this point that it is not a number of different spots of the sample that are represented, but several like images of one and the same spot of the sample are produced at different places by simultaneous transposition. The distances of transpositions, number of fields, proportions of areas, form, size and selection of color of such simultaneous fields of vision can b modified to suit widely different purposes. Colored simultaneous fields of vision can be realized in a great variety of special designs for vision tests, contrast and harmony tests.

Examples of simultaneous fields of vision are given in the drawings, in which the samples are designated by the letter P, and the comparison color fields by small letters.

It has been noted hereinbefore that color can be defined in terms of three attributes namely, hue; whiteness or saturation; and blackness or darkness stage. The variation of the three attributes determines the resulting color.

Figure 1:
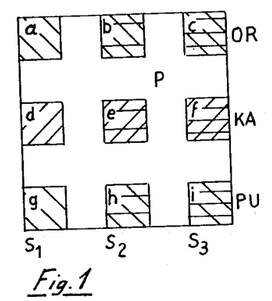
FIG. 1 shows a ninefold simultaneous field of vision in its simplest form as an arrangement of nine small squares in a sample color area.
Figure 1A:
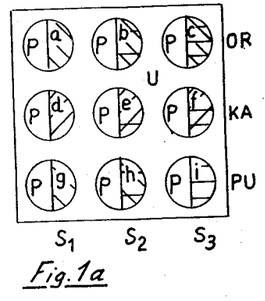
FIG. 1a shows the same arrangement, covered with a surrounding fieldmask which has circular openings.
Figure 2:
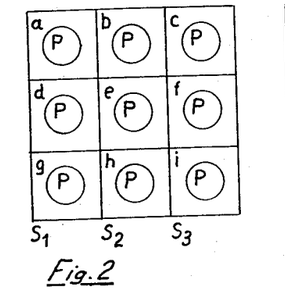
FIG. 2 represents adjacent squares with circular apertures which reveal the sample color.
Figure 2A:
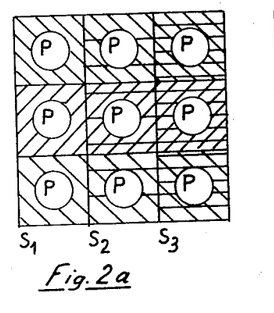
FIG. 2a shows the same arrangement as FIG. 2, but illustrates color differences by different hatch lines.
Figure 2B:
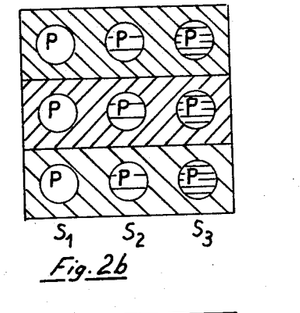
FIG. 2b illustrates color differences in the sample color fields.
Figure 3:
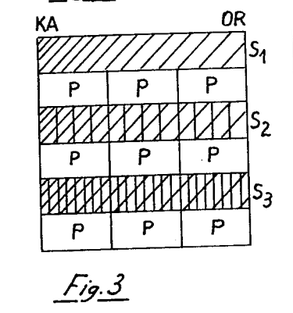
FIG. 3 shows a simultaneous field of vision with horizontally continuous comparison color fields.
Figure 3A:
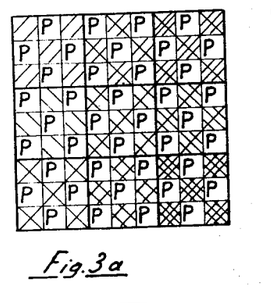
FIG. 3a illustrates the arrangement of comparison color fields and sample color fields in a desired pattern.

The color appearance of a simultaneous field of vision is illustrated by the following example in relation to FIGS. 1 and 2:

EXAMPLE I

| a | b | c |
|---|---|---|
| light orange-red | orange-red | deep orange-red |
| d | e | f |
| light carmine-red | carmine-red | deep carmine-red |
| g | h | i |
| light purple-red | purple-red | deep purple-red |

Assume that horizontal zones show the same hue. The vertical zones are assigned to the zones of saturation. The central comparison color field e corresponds to the desired color, i.e., the specified color. The hue of field d is less saturated than field e, that of field f is more saturated than the specified color in e. The color of field b is more yellowish, that of field h is more bluish than the specified color carmine-red of field e. The corner fields show deviations in two directions from that of field e: field a is more yellowish and less saturated, field g is more bluish and less saturated. Field c is more yellowish and more strongly saturated, field i is more bluish and more strongly saturated.

Figure 8:
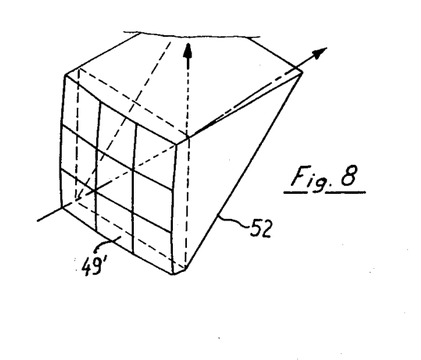
FIG. 8 is a perspective view of a multiple light-deflecting element by way of example in combination with an inclined plane surface.

The multiple light-deflecting elements necessary for simple devices for the application of the method are represented in FIGS. 6, 6a, 7, 7a, and 12. They have a number of surfaces 42a to 42i, 49a to 49i and 58 respectively, which are slightly inclined towards one another and arranged side by side and cause convergence of the beams incident upon them. Surfaces 42a to 42i preferably are surface mirrors, whereas surfaces 49a to 49i and 58 respectively are prismatic zones of a body with refractive properties. In addition to a convergence of beams, the light-deflecting elements according to FIGS. 6, 8 and 9 also cause a common change in direction of all beams (e.g. at a right angle), whereas light-deflecting elements according to FIGS. 7 and 12 respectively do not change the straight-lined path.

For the purpose of the most simple method of a visual simultaneous comparison of colors, a multiple light-deflecting element 49 (FIG. 7) is provided with a handle (not shown)—similar to the handle of a magnifying glass—and a color chart 50 with openings 51 (FIG. 7a) is placed directly on the upper side of the multiple light-deflecting element 49, e.g. by inserting it into a small frame. Exactly in the manner of handling a magnifying glass, the multiple light-deflecting element 49, together with the color chart placed on it, is held over the sample and its vertical height is varied in small degrees until homogenous and uniformly colored images of one spot of the sample are visible in the openings 51. At one glance it can be judged which of the fields of the color chart comes closest to or is equal to the sample color. For the purposes of frequently checking colorations, e.g. in commercial enterprises, color charts indicating the permissible color deviations or tolerances can be used. By this arrangement deviations in two directions can be checked. By way of example, for the checking of a carmine-red color the color chart fields of color chart 50 (FIG. 6a and 7a) are arranged according to example I described above. On the basis of this systematic arrangement the direction and approximate degree of a color deviation can immediately be ascertained. A possible difference in brightness between the sample and the color chart can be compensated within certain limits by a slight turn away from the light, of the multiple light-deflecting element, or merely by turning the color chart. If larger differences in brightness are involved—also called differences in the degree of "darkness" —the color chart must be replaced.

If the method as described above is carried out with optical comparison color fields to replace the color charts, so that by adding further parts, the multiple light-deflecting element is expanded into a more elaborate device, additional possibilities for application result.

All apparatus for visual comparison so far in existence had bipartite fields of vision. By the simultaneous field of vision the principle of the present invention differs basically from the prior art, since each setting is simultaneously judged as to equality (visual correspondence) and multiple neighboring color contrast. Due to the simultaneous presence of a number of different colors the eye is also prevented to a large extent from undergoing the known phenomenon of chromatic adaptation.

In substance, a device for carrying out the method for determining in a visual manner colors and color tolerances in any kind of artificial light or sunlight in accordance with the present invention comprises a number of movable diaphragm plates and one immovable diaphragm plate having transparent as well as opaque areas, said diaphragm plates being arranged in the path of rays of any desired light source, for instance, at the front of a casing of the device. The transparent areas of the immovable diaphragm plate can be covered alternately and to varying degrees by the opaque areas of the movable diaphragm plates by moving said diaphragm plates. The diaphragm plates are provided with scale parts, scale divisions and reading marks preferably placed directly thereon. In the interior of the casing each transparent area of the immovable diaphragm plate is assigned one light-deviating unit, which units are directed towards the test color surfaces or the sample in a sample holder. The chromatic test color surfaces are jointly assigned one of the commonly known optical devices for the mixing of light, preferably a set of glass plates, whereas each of the neutral-gray test color surfaces is assigned one of the commonly known optical devices for the mixing of light, preferably a set of glass plates, each. For bending the paths of rays commonly known deviating mirrors are provided. A multiple light-deflecting element together with a multiple discontinuous, preferably specular surface produces the simultaneous field of vision, which is seen through an eyepiece.

A simultaneous field of vision in accordance with the present invention offers the possibility of introducing comparison color fields in other optical instruments (e.g. telescope, microscope, medical examination apparatus such as endoscopes, etc.) without thereby losing too much of the size of the field of vision of the instrument.

Figures 9, 11:
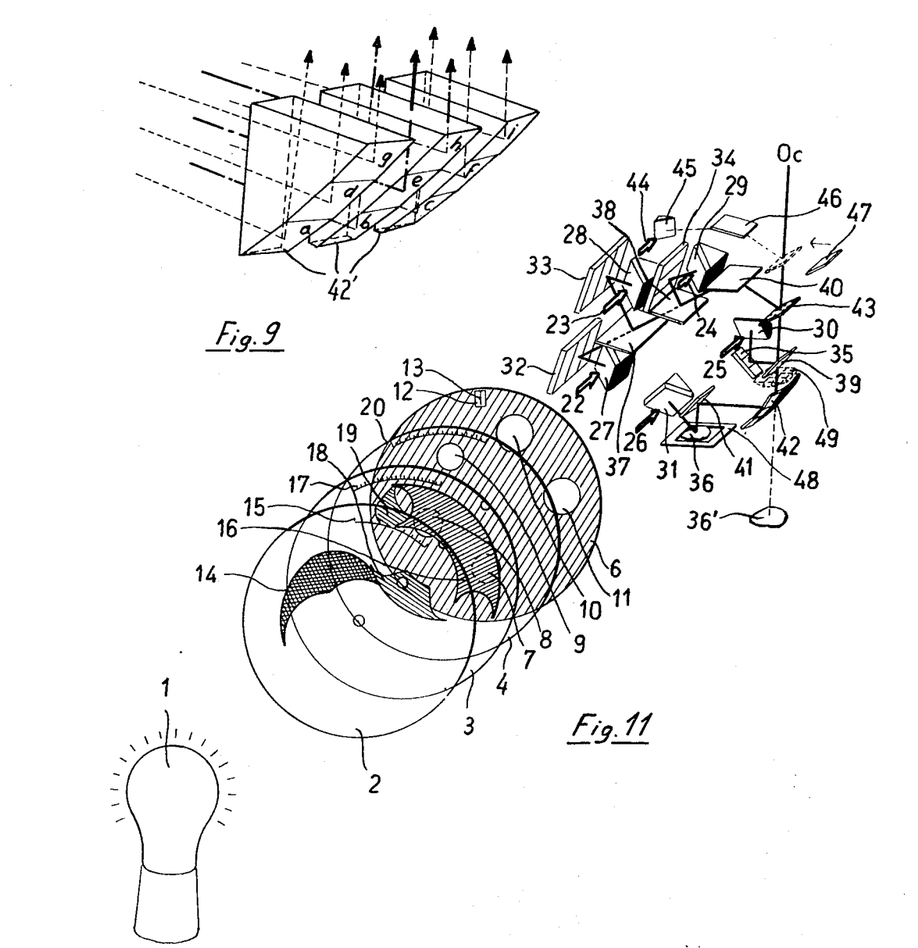
FIG. 9 shows the inverse design of a multiple light-deflecting element with totally reflecting surfaces.
FIG. 11 is a perspective view of the schematic structure of a path of rays for a device for the determination of colors.
Figure 10:
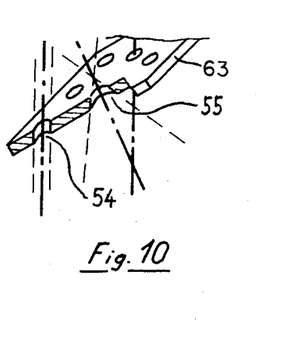
FIG. 10 represents a multiple discontinuous, preferably specular surface, with inclined and/or tapered bores.

The mode of operation of one possible device in accordance with the present invention is as follows:

As can be seen from FIG. 11, three diaphragm plates 2, 3, and 4, which are arranged one after the other and are pivoted on a common center, are placed in the path of a light source 1. The fourth diaphragm plate 6 is mounted so as to be immovable. The diaphragm plates 2, 3, 4, and 6 are of glass and are each provided with a photographic layer. The immovable diaphragm plate 6 is blackened (opaque) over its entire surface and has transparent areas 7, 8, 9, 10, and 11 as well as with the reading window 12 with reading mark 13. The transparent areas 7, 8, 9, 10, and 11 and the reading window 12 correspond to the openings in a casing (not illustrated) through which the light can pass into the interior in the directions of arrows 22, 23, 24, 25, 26 and 44.

The movable diaphragm plates 2, 3, and 4 are transparent almost over their entire surfaces (without photographic layer) and are blackened only (opaque) at a few special places. Diaphragm plate 2 possesses the opaque area 14 and a scale 15. It is important that the scale occupy a precise, fixed relation with the opaque area. For this purpose the opaque area 14 and the scale 15 are applied to plate 2 by a photographic process; the diaphragm plate 3 has the opaque area 16 and a scale 17 photographically applied with said opaque area; the diaphragm plate 4 has two opaque areas 18 and 19, as well as a scale 20 photographically applied with said opaque areas 18 and 19.

Depending on the position of the diaphragm plates 2, 3, and 4 the transparent areas 7, 8, 9, 10, and 11 of the immovable diaphragm plate 6 are either completely, partly or not at all eclipsed by the opaque areas 14, 16, 18, and 19 of said diaphragm plates. The arrangement will suitably be such that the transparent area 7 remains free when the transparent areas 8 and 9 are eclipsed by the opaque areas 18 and 19. Conversely, the transparent areas 8 and 9 remain free as soon as the opaque area 18 begins to eclipse the transparent area 7. Thus the diaphragm plate 4 with the opaque areas 18 and 19 alternately covers the transparent areas 8 and 9 together or the transparent area 7 alone. At a certain position (Zero) no one of the transparent areas 7, 8 and 9 are eclipsed and the light can pass simultaneously through all said transparent areas.

Contrary to the above is the interaction between the opaque area 16 and the transparent areas 10 and 11. At a certain position (zero on the scale of the diaphragm plate 3) both transparent areas 10 and 11 are entirely eclipsed by the two ends of the opaque area 16 of the diaphragm plate 3. If the diaphragm plate 3 is moved in a clockwise direction, the opaque area 16 is removed from the transparent area 10 and thus the light is allowed to pass in the direction of the arrow 24. The transparent area 11, however, remains eclipsed. If the diaphragm plate is moved in the opposite direction, the opposite end of the opaque area 16 releases the transparent area 11 for the passage of light in the direction of the arrow 25. The diaphragm plate 3 with the opaque area 16 thus covers the transparent areas 10 and 11 alternately or simultaneously.

In addition to diaphragm plate 4, diaphragm plate 2, whose opaque area 14 alternately covers transparent areas 8 and 9, affects transparent areas 8 and 9. At a certain position (zero of the scale) of the diaphragm plate 2 the transparent area 8 is free and the transparent area 9 completely eclipsed. When the diaphragm plate is moved in a counter clockwise direction the opaque area 14 increasingly covers the transparent area 8 and at the same time releases an equally large portion of the transparent area 9.

For the purposes of comparing the sample color 36 with the test color surfaces 32, 33, 34, and 35, a path of rays is directed in such a way that all these areas can be viewed simultaneously when locking through the ocular or eyepiece Oc.

To this end set of glass plates 37 is interposed between test color surfaces 32 and 33, a set of glass plates 38 is disposed for (mirror-) reflecting of the test color surface 34, a set of glass plates 39 for (mirror-) reflecting of the test color surface 35 and two mirrors 40 and 41 are arranged for bending the ray path.

Furthermore, a multiple discontinuous surface 43 is placed in the path of rays of the sample, by means of which the path of rays of the test colors is combined with the path of rays of the sample, said surface 43 having openings through which the individual bundles of rays of the multiple light-deflecting element 42 (or, in the case of linearly continued path those of a multiple light-deflecting element 49) coming from sample 36 or 36' are viewed.

If the test color surface 32 is coated with, for instance, three very pure, intensive hues (test colors), these colors, e.g. ORANGE-RED, CARMINE-RED, PURPLE-RED -according to FIG. 2 and example I above — appear luminous and intensive whenever the transparent area 8 of the immovable diaphragm plate 6 is fully opened; the full quantity of light can enter the casing through the diaphragm in the direction of the arrow 22 and is directed by the light-deviating unit 27 onto the test color surfaces. When by turning the diaphragm plate 4 the transparent area 8 is increasingly eclipsed by the opaque area 18 of the diaphragm plate, these colors appear increasingly darker and finally (when the transparent area 8 is completely covered) black.

The same procedure also applies to the second test color surface 33 with its respective transparent area 9, direction of arrow 23, and the light-deviating unit 28.

For reasons of expedience three pure and intensive hues (test colors) e.g. adjacent hues of the known 24-step color circle will be chosen also for test color surface 33. For instance, the hue steps ORANGE-RED 6, CARMINE-RED 8 and PURPLE-RED 10 for the test color surface 32 and the hue steps RED 7, CARMINE 9, and PURPLE 11 for the test color surface 33.

When the transparent area 8 is fully open (and thus the transparent area 9 completely eclipsed by the opaque area 14 of the diaphragm plate 2), only the test colors of the test color surface 32 (in the example orange-red 6, carmine-red 8 and purple-red 10) are fully illuminated and visible in the path of rays in their full strength.

If now, the diaphragm plate 2 is moved, the transparent area 8 is covered just as much as transparent area 9 is exposed by opaque area 14. Thereby a continuous reduction of the illumination of test color surface 32 and, simultaneously, a correspondingly increasing illumination of test color surface 33 is caused. Simultaneously with the directly viewed hues ORANGE-RED 6, CARMINE-RED 8, and PURPLE-RED 10, the hue RED 7, reflected in increasing strength and superimposed via the set of glass plates 37, is presented in the path of rays at the time place and together with the ORANGE-RED 6 theretofore visible, so that both color sensations are perceived optically blended, depending on how large the share of one color is in relation to that of the other one. Assuming the case, that transparent areas 8 and 9 are half opened each, the two test color groups are each illuminated by half the quantity of light and mix into the intermediate hues ORANGE-RED 6.5, CARMINE-RED 8.5, and PURPLE-RED 10.5.

By this continuous regulation with diaphragm plate 2 all intermediate steps, or rather all intermediate colors, between the two test color groups 32 and 33 can be optically mixed.

Independently of the mixing of hues black can be added, in the manner described above, by means of diaphragm plate 4 so that the intermediate hues ORANGE-RED 6.5, CARMINE-RED 8.5, and PURPLE-RED 10.5, mentioned above can at the same time be progressively darkened until they appear black.

In addition to the mixing of hues with one another into pure intermediate hues and the darkening into black as described above, a third variation is provided for:the "desaturation" of hues by means of optical adding of white.

As illustrated in FIG. 11 an additional set of glass plates 38 is placed in the path of rays. The bundle of rays in the direction of the arrow 24, which passes the transparent area 10 of the immovable diaphragm plate 6 and strikes the light-deviating unit 29, illuminates the test color surface 34 which is provided either with a white test surface or with plural band gray scale (e.g. one band each of white, light-gray and medium-gray). The image of this gray scale when the transparent area 10 is exposed (this is done by turning diaphragm plate 3) is superimposed on the image of the hues (of test color surfaces 32 and 33), visible in the path of rays, by way of the set of glass plates 38, whereby, depending on the luminous intensity of light in the direction of the arrow 24, said colors appear optically "diluted," i.e. desaturated by varying degrees.

The simultaneous field of vision viewed in the eyepiece can thus be modified in the following manner:

1. Variation of the visible test colors by changing the hues.
2. Variation of the color sensation produced by the visible test colors by optically mixing one test color group 32 with the other 33 into intermediate hues - by means of diaphragm plate 2.
3. Variation of saturation (admixture of white) by means of the diaphragm plate 3.
4. Variation of darkness (admixture of black) by means of the diaphragm plate 4.

Compared with example I above the first possibility for modification (changing the hues) produces a simultaneous field of vision for example of the following appearance:

EXAMPLE II

| a | b | c |
|---|---|---|
| light carmine-red 8 | carmine-red 8 | deep carmine-red 8 |
| d | e | f |
| light purple-red 10 | purple-red 10 | deep purple-red 10 |
| g | h | i |
| light purple 12 | purple 12 | deep purple 12 |

As compared to example I, the second modification (color mixing) produces a simultaneous field of vision of the following appearance:

EXAMPLE III

| a | b | c |
|---|---|---|
| light orange-red 6.5 | orange-red 6.5 | deep orange-red 6.5 |
| d | e | f |
| light carmine-red 8.5 | carmine-red 8.5 | deep carmine-red 8.5 |
| g | h | i |
| light purple-red 10.5 | purple-red 10.5 | deep purple-red 10.5 |

The third possibility for modification (degree of saturation) produces the following:

EXAMPLE IV

| a | b | c |
|---|---|---|
| pale orange-red 6 | light orange-red 6 | orange-red 6 |
| d | e | f |
| pale carmine-red 8 | light carmine-red 8 | carmine-red 8 |
| g | h | i |
| pale purple-red 10 | light purple-red 10 | purple-red 10 |

The fourth possibility for modification (degree of darkness) produces the following:

EXAMPLE V

| a | b | c |
|---|---|---|
| dull orange-red 6 | broken orange-red 6 | dark orange-red 6 |
| d | e | f |
| dull carmine-red 8 | broken carmine-red 8 | dark carmine-red 8 |
| g | h | i |
| dull purple-red 10 | broken purple-red 10 | dark purple-red 10 |

These few examples show that, in effect, the multiplicity of colors in all their shadings can be adjusted and for the first time changed simultaneously and systematically in groups.

In practice, the central color e will be adjusted to chromatic equality as in a known equality with the sample image P method The colors visible at the periphery will be very similar in color to the sample image P, but not fully equal to it. The degree of inequality is to be perceived as to be of equal extent in all peripheral comparison color fields, whereas, in the case of chromatic equality in the central comparison color field, the line of demarcation between said comparison color field and the sample field begins to disappear.

In this novel manner each setting is judged at the same time as to chromatic equality (visual correspondence) and simultaneous neighboring color contrast whereby measuring conditions are greatly improved. The eye is offered, so to speak, points of reference around the desired color and by this "optical comfort" is provided with optimal working conditions.

Figure 4:
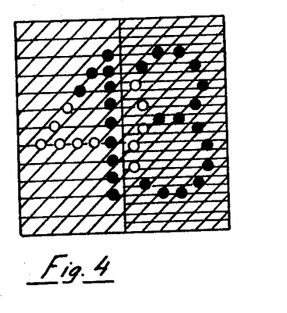
FIG. 4 represents the application of the principle of simultaneity to a type of design which is used for the purpose of color vision testing.
Figure 5:
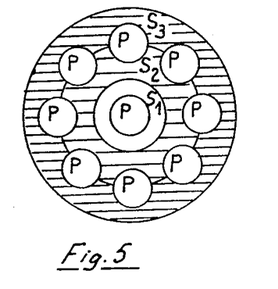
FIG. 5 shows a division of a simultaneous field of vision into concentric zones.
Figure 5A:
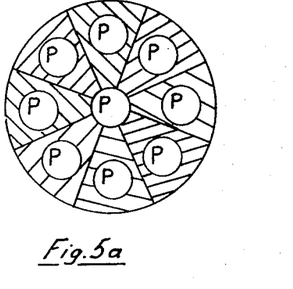
FIG. 5a shows the division of a simultaneous field of vision into sectors.
Figures 6, 6A, 7, 7A:
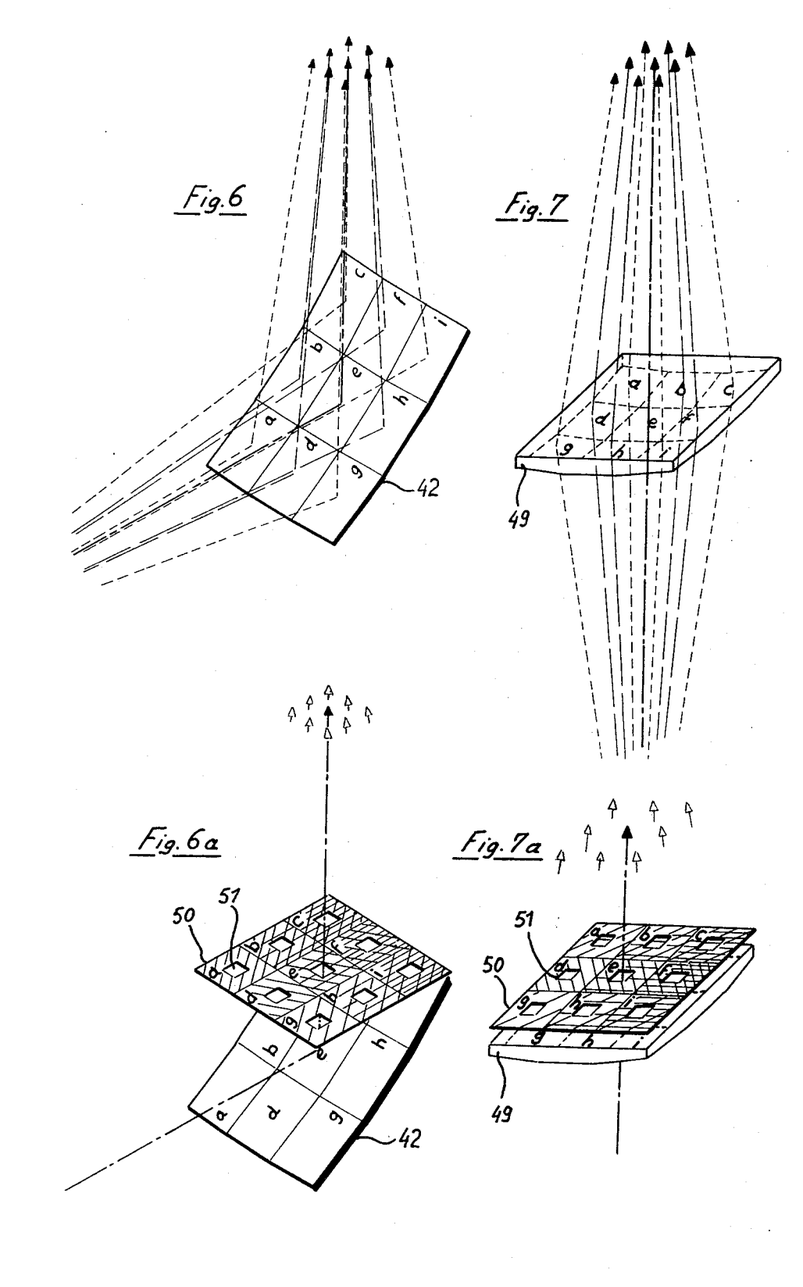
FIG. 6 is a perspective view of a multiple light-deflecting element with reflecting, slightly inclined surfaces.
FIG. 7 is a perspective view of a multiple of light-deflecting elements with refractive surfaces.
FIGS. 6a and 7a represent a simultaneous field of vision in its simplest form, produced by a colored (e.g. printed) surface having openings together with a multiple light-deflecting element.

The principle set forth herein lends itself to an extraordinarily great number of modifications and embodiments. Thus, for instance, a surface resolved into color dots, according to the principle of the pseudo-isochromatic charts, like FIG. 4, can be used in order to determine exactly the degree of color sense-deficiency. The surface of the simultaneous field of vision is executed in pseudo-isochromatic colors and is then adjusted to maximum admixture of white. The patient is seated in front of the device and perceives a white surface. Subsequently, white admixture is gradually reduced until the individual color dots emerge as from a fog. The pseudo-isochromatic test figure is first perceived quite dimly as 48 and only when the admixture of white is further reduced, the correct, single-colored FIG. 13 will be recognized. From the readings which are taken, the first time when something becomes dimly visible at all and the second time when finally the colors, being progressively intensified, are clearly distinguished, true color perception can be exactly diagnosed, above all in those cases in which the chart methods in use up to now are not adequate and where anomaloscope examinations reveal anomalous trichromatism.

FIGS. 12–15 show various arrangements whereby the different simultaneous fields of vision can be obtained.

Figure 1B:
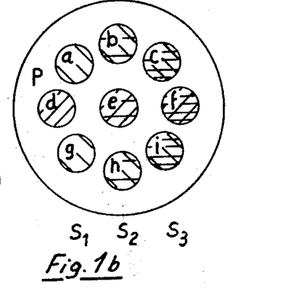
FIG. 1b shows an arrangement of circular surfaces within a circular sample color area.
Figures 12, 13, 14, 14A, 14B:
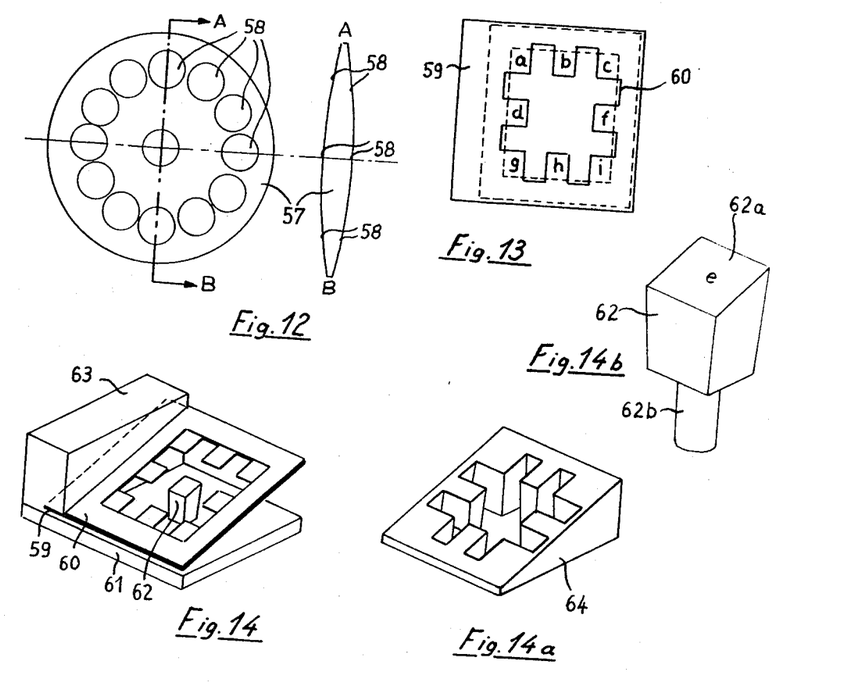
FIG. 12 shows a round, multiple light-deflecting element in plan view and in section along line A-B.
FIG. 13 shows a multiple, discontinuous, preferably specular surface, for producing a simultaneous field of vision as shown schematically in FIG. 1.
FIG. 14 shows a multiple, discontinuous, preferably specular surface together with a central reflector, which is mounted on a transparent body.
FIG. 14a shows a multiple, discontinuous, preferably specular surface which serves at the same time as carrying agent and whose inner edges are tapered.
FIG. 14b is an enlarged view of the central reflector shown in FIG. 14.

In FIG. 12 is shown a refractive multiple light deflecting element 57 with slightly inclined planar surfaces 58 arranged in annular array therein for producing a simultaneous field of vision as shown in FIG. 1b.

FIG. 13 shows a metal plate 59 with openings and a covering mask 60 for producing the simultaneous field of vision as shown in FIG. 1. As seen in FIG. 14, the plate 59 is mounted above a transparent body 61 by being retained in a block 63 which is secured to body 61. A tapered reflector 62 is centrally disposed within the plate 59 and is mounted in body 61 by pin 62b. The upper surface of the plate 59 is polished in order to reflect the comparison colors into the simultaneous field of vision.

FIG. 14a shows the plate formed as a one-piece body 64 with appropriate tapered recesses so that the rays of the sample image can pass therethrough.

Figure 15:
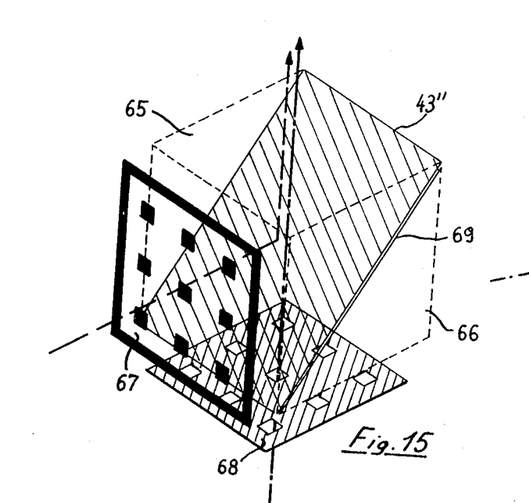
FIG. 15 is a perspective view of two possible embodiments of multiple, discontinuous, preferably specular surfaces, that shown in dotted lines representing two known photometer prisms which have masks in front of each of their short sides, while the hatched surface represents a cheaper design with a set of glass plates instead of the expensive prisms.

As shown in FIG. 15, the simultaneous field of vision can be produced with masks 67 and 68, mask 67 serving for blocking the regions in which the comparison color is to be placed, whereas mask 68 has openings for the passage of the rays of the sample color. A pair of photometer prisms 65, 66 cooperate with the masks 67, 68, to produce in a plane 43″ a simultaneous field of vision similar to that in FIG. 2, but with square sample color regions. Instead of the photometer prisms 65,66, there may be employed a set of glass plates 69 which serve to reflect the rays of the comparison colors and permit passage therethrough of the rays of the sample color.

Figure 16:
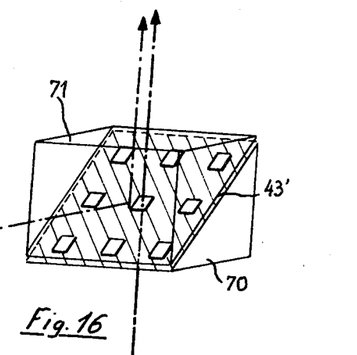
FIG. 16 is a perspective view of the principal design of a multiple, discontinuous surface consisting of a specially treated and an untreated prism.

FIG. 16 shows another arrangement for producing a simultaneous field of vision similar to that produced by the apparatus of FIG. 15. In FIG. 16 there are shown photometer prisms 70,71 which produce a reflecting surface 43′ which is discontinuous at the locations where the sample color is to be passed. This is achieved by contact of the prisms in the square-shaped non-reflecting regions. The paths of the sample color rays and the comparison color rays are shown by dash-dot arrow lines.

We claim:

1. A visual method of performing color evaluation of a color sample, said method comprising producing, in a plane spaced from a color sample, multiple virtual images of a single small area of said color sample, composing said images in said plane in juxtaposition with a plurality of individual separate color comparison places which differ slightly in color from one another, one for each sample image, forming in said plane a simultaneous field of vision in which appear said images and said color comparison places such that the color of the sample can be compared with the colors of the color comparison places, the colors of the color comparison places being obtained by the selective combination of the three color attributes thereof such that the colors of the color comparison places differ only slightly from one another, and visually comparing the color of the sample images with that of said color comparison places and simultaneously varying the color of the latter by selectively varying at least one of the color attributes thereof to achieve visual correspondence of said sample color with one of said places.

2. A visual method of performing color evaluation of a color sample, said method comprising producing in a plane a plurality of separate color comparison regions by selectively combining the three color attributes of the colors in the comparison regions such that said colors of the comparison regions differ only slightly from one another, producing images of a small area of a color sample and distributing the images of said sample area in juxtaposition with each comparison region in said plane whereby there is produced in said plane a simultaneous field of vision in which the color of the sample can be visually compared with that of said comparison regions, and simultaneously varying at least one of the color attributes of the colors of the comparison regions to establish visual correspondence of the sample with one of said comparison regions.

3. A method as claimed in claim 2, wherein said comparison regions are arranged in said field of vision with a central region and a plurality in surrounding regions, the visual correspondence of the color of the sample being made with the color of the central region while simultaneously the colors of the surrounding regions can be compared with the color of the sample to view the magnitude of the color contrast therebetween.

4. Apparatus for enabling color evaluation of a color sample, said apparatus comprising first means for producing a plurality of separate color comparison images each differing in color slightly from one another and for distributing the color comparison images into a plane wherein said images form color comparison regions, and second means for producing a multiplicity of images of a single small area of a color sample, and for applying such images in juxtaposition with said color comparison regions in said plane to form in said plane a simultaneous field of vision of said sample images and said color comparison regions, such that the color of the sample can be compared simultaneously with all the colors of said color comparison regions.

5. Apparatus as claimed in claim 4, wherein said first means for producing the separate color comparison regions comprises means for combining the three color attributes of the color at each of said color comparison regions, and means for simultaneously varying at least one of said color attributes for all of said regions.

6. A device for visually determining color and color tolerances of a sample in natural and artificial light, said device comprising an eyepiece having a field of vision, a light deflecting element, an element with a reflective multiple discontinuous surface between said light deflecting element and the field of vision, said light deflecting element and multiple discontinuous surface being operatively associated with a color sample to produce in said field of vision a plurality of images of a small area of said color sample, and means for producing a plurality of color comparison images which differ only slightly in color from one another, the latter said means being operatively positioned relative to said discontinuous surface such that said color comparison images are passed from said multiple discontinuous surface into said field of vision in juxtaposition with the sample images.

7. A device as claimed in claim 6 comprising a holder for said color sample, and means for controlling the amount of light which strikes the sample.

8. A device as claimed in claim 6 comprising means in the path of a light source for selectively controlling illumination of said sample and of the means which produces the color comparison images.

9. A device as claimed in claim 8, wherein said means for controlling illumination comprises a fixed diaphragm plate and a plurality of movable diaphragm plates disposed between the source of light and said eyepiece, said diaphragm plates having transparent and opaque areas arranged in such manner that movement of the movable diaphragm plates causes the opaque areas of such plates to eclipse alternately and in varying degrees the transparent areas of the fixed diaphragm plate, said transparent areas of the fixed diaphragm plate serving for the illumination of the sample and the means which produces the color comparison images.

10. A device as claimed in claim 9, wherein said means for producing the color comparison images comprises a first chromatic test color surface, and a neutral-gray test color surface, and light deviating units, one for each test color surface, operatively arranged with a respective transparent area of the fixed diaphragm plate for illuminating the test color surfaces with the light passing through said transparent areas, and means for superimposing light reflected from said test color surfaces to produce the color comparison images.

11. A device as claimed in claim 6, wherein said light deflecting element has a plurality of inclined surfaces in side-by-side relation to produce the plurality of separate images of said small area of the color sample, said multiple discontinuous surface having openings for the passage of said sample images to the field of vision.

12. A device as claimed in claim 10 further comprising a second neutral-gray test color surface and means for superimposing light reflected from said second neutral-gray test color surface onto each said sample image, and a further light deviating unit for illuminating the second neutral-gray test color surface.

13. A device as claimed in claim 10, wherein said means for producing the color comparison images further comprises a second chromatic test color surface, and an associated light deviating unit, and optical light mixing means for mixing color images produced by the two said chromatic test color surfaces.

14. A device as claimed in claim 9, wherein the movable diaphragm plates are provided with scales which are in fixed relation with said opaque areas thereof.

15. A device as claimed in claim 14, wherein said scales are fixedly attached to said movable diaphragm plates, and wherein said scales and said opaque areas are integrally formed of a single layer each.

16. A device as claimed in claim 15, wherein said single layer is metal foil.

17. A device as claimed in claim 9, wherein the opaque areas of the movable diaphragm plates are so shaped as to permit said alternate eclipsing, whereby optical switching is effected by mixing white and/or black in the path of light rays of the test colors and alternately in the path of light rays of the sample.

18. A device as claimed in claim 6, wherein the element with the multiple discontinuous surface is inclined with respect to light rays reflected from the sample, said element being provided with openings which are tapered.

19. A device as claimed in claim 6, wherein said multiple discontinuous surface comprises mirror portions for reflecting the light rays from said sample and opaque portions corresponding to the desired shape of the sample images.

20. A device as claimed in claim 6, wherein said element with the multiple discontinuous surface comprises a photometer prism with a reflecting surface which is selectively discontinued and a second prism with intact surfaces, and two inversely shaped masks, respectively corresponding to the desired shape of the color comparison regions and the sample images.

21. A device as claimed in claim 6, wherein said element with the multiple discontinuous surface comprises an arrangement of one set of glass plates and two inversely shaped masks, respectively corresponding to the desired shape of the color comparison images and the sample images and arranged between the eyepiece and the means for producing the color comparison images and the sample.

22. A device as claimed in claim 6, wherein said element with the multiple discontinuous surface comprises a metal piece in combination with a tapered central reflector which is mounted on a transparent plate-shaped body, the transparent body being mounted on a block which also carries the metal piece.

23. A device as claimed in claim 22, wherein the metal piece tapers in a manner similar to the central reflector and is integral with the block.

24. A device as claimed in claim 10, wherein said chromatic test color surface is provided with parallel bands of different hues, said neutral-gray test color surface being provided with parallel bands having varying degrees of whiteness, said surfaces being oriented such that the bands thereof extend perpendicular to one another.

25. A device as claimed in claim 11, wherein said light deflecting element is a one-piece body having refractive properties.

26. A device as claimed in claim 11, wherein said light deflecting element has mirrored reflecting surfaces.

* * * * *